US010281925B2

(12) United States Patent
Sakr et al.

(10) Patent No.: US 10,281,925 B2
(45) Date of Patent: May 7, 2019

(54) ESTIMATE OF GEOGRAPHICAL POSITION OF A VEHICLE USING WIRELESS VEHICLE DATA

(71) Applicant: TOYOTA JIDOSHA KABUSHIKI KAISHA, Toyota-shi, Aichi-ken (JP)

(72) Inventors: Ahmed Hamdi Sakr, Mountain View, CA (US); Gaurav Bansal, Mountain View, CA (US)

(*) Notice: Subject to any disclaimer, the term of this patent is extended or adjusted under 35 U.S.C. 154(b) by 71 days.

(21) Appl. No.: 15/331,597

(22) Filed: Oct. 21, 2016

(65) Prior Publication Data
US 2018/0113472 A1    Apr. 26, 2018

(51) Int. Cl.
G05D 1/02    (2006.01)

(52) U.S. Cl.
CPC ................ G05D 1/0276 (2013.01)

(58) Field of Classification Search
CPC ............. G05D 1/0278; G05D 1/0088; G05D 2201/0213; G05D 1/0246; G05D 1/0274
See application file for complete search history.

(56) References Cited

U.S. PATENT DOCUMENTS

| | | | | |
|---|---|---|---|---|
| 8,520,695 B1 * | 8/2013 | Rubin | ...................... | G08G 9/02 370/445 |
| 2007/0152804 A1 * | 7/2007 | Breed | .................. | B60N 2/2863 340/435 |

FOREIGN PATENT DOCUMENTS

| | | |
|---|---|---|
| JP | 2004-251822 | 9/2004 |
| JP | 2007-178270 | 7/2007 |
| JP | 2009-150722 | 7/2009 |

OTHER PUBLICATIONS

Young-Woo Seo, Tracking and Estimation of Ego-Vehicle's States for Lateral Localization, May 2014.*

* cited by examiner

*Primary Examiner* — Khoi H Tran
*Assistant Examiner* — Michael Ngoc Phong Nguyen
(74) *Attorney, Agent, or Firm* — Burbage Law, P.C.; Jon-Michael Burbage; Elizabeth Ruzich

(57) ABSTRACT

The disclosure includes embodiments for improving an estimate of a geographical position of an ego vehicle using wireless vehicle data of a remote vehicle. A method according to some embodiments includes determining ego estimate data based on remote GPS data and relative position data. The remote GPS data describes a geographical location of the remote vehicle. The relative position data describes a location of the ego vehicle relative to the remote vehicle as measured by onboard sensors of the remote vehicle. The ego estimate data describes the geographical location of the ego vehicle from the perspective of the remote vehicle. The method includes fusing the ego estimate data and ego GPS data to form fused data. The ego GPS data describes the geographical location of the ego vehicle from the perspective of the ego vehicle. The fused data describes the geographical location of the ego vehicle with lane-level accuracy.

20 Claims, 9 Drawing Sheets

BSM DATA 195

- Vehicles and other client devices equipped with Direct Short Range Communication ("DSRC") transmit a Basic Safety Message ("BSM") at a regular interval.

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 4A

BSM DATA 195

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate)
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 4B

ESTIMATE OF GEOGRAPHICAL POSITION OF A VEHICLE USING WIRELESS VEHICLE DATA

BACKGROUND

The specification relates to improving an estimate of a geographical position of an ego vehicle using wireless vehicle data of a remote vehicle.

Vehicle control systems are becoming increasingly popular. One example of a vehicle control system is an Advanced Driver Assistance System ("ADAS system" if singular, "ADAS systems" if plural).

There is a growing need in vehicular design for improved information describing the geographical position of vehicles. Modern vehicles (or other computing devices) may be equipped with a Global Positioning System (a "GPS" if referenced generally, or a "GPS unit" if in reference to a specific device). A GPS unit may wireless communicate with one or more GPS satellites to ascertain GPS data. The GPS data is data associated with the GPS unit and received from the one or more GPS satellites. The GPS data describes the geographical position the vehicle which includes the GPS unit.

GPS data sourced by a conventional GPS unit is generally accurate to within plus or minus 10 meters of the actual geographical position of the vehicle. This is not sufficiently accurate for some modern vehicular applications, such as those that may be provided by an ADAS system of a vehicle that supports certain safety applications or autonomous driving applications. A source of more accurate data describing the geographical position of a vehicle is needed.

SUMMARY

Described are embodiments that include a system, method and a computer program product for improving an estimate of a geographical position of an ego vehicle using wireless vehicle data of a remote vehicle. As used herein, the words "geographic location," "location," "geographic position" and "position" refer to a latitude and longitude of an object such as the ego vehicle or the remote vehicle. The example embodiments described herein provide positioning information that describes the geographical position of the ego vehicle with an accuracy of at least plus or minus 1.5 meters in relation to the actual geographic position of the ego vehicle. Accordingly, the example embodiments described herein are able to describe the geographical position of the ego vehicle with lane-level accuracy or better.

Since a lane of a roadway is generally 3 meters wide, any positioning information that is accurate to within plus or minus 1.5 meters of the actual geographic position of the vehicle is sufficient to provide lane-level accuracy. Some safety or autonomous driving applications provided by the ADAS system of a modern vehicle require positioning information that describes the geographical position of the vehicle with lane-level accuracy. In addition, the current standard for Dedicated Short Range Communication ("DSRC") requires that the geographical position of the vehicle be described with lane-level accuracy. However, engineers have struggled to identify a technology that can achieve lane-level accuracy. Embodiments described herein solve this problem, among others.

DSRC has a range of substantially 500 meters and is designed to be compatible for wirelessly sending and receiving messages among mobile nodes such as vehicles and Roadside Units ("RSU" if singular, "RSUs" if plural).

In some embodiments, the ego vehicle and one or more of the remote vehicles may be DSRC-equipped vehicles. A DSRC-equipped vehicle includes a vehicle that includes one or more of the following elements: a DSRC transceiver and any software or hardware necessary to encode and transmit a DSRC message; a DSRC receiver and any software or hardware necessary to receive and decode a DSRC message; and onboard hardware or software that is capable of providing positioning information that describes the geographical position of the vehicle with lane-level accuracy. A conventional GPS system may only have an accuracy of plus or minus 10 meters relative to the actual geographic position of the vehicle, and so, a vehicle that includes a conventional GPS system without any other hardware of software sufficient to provide positioning information that describes the geographical position of the vehicle with lane-level accuracy is not a DSRC-equipped vehicle.

In some embodiments, devices other than vehicles may be DSRC-equipped. These DSRC-equipped devices may be used to relay wireless vehicle data to the ego vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use wirelessly transmit and receive wireless vehicle data among an ego vehicle and one or more remote vehicles. Wireless vehicle data may include any data that is: (1) associated with a vehicle; and (2) transmitted via a wireless message such as a DSRC message or a Basic Safety Message ("BSM") by either a DSRC-equipped vehicle or a DSRC-equipped device.

In some embodiments, an ego vehicle is a DSRC-equipped vehicle. A remote vehicle may also be a DSRC-equipped vehicle. The ego vehicle and the remote vehicle may each include (1) a GPS unit; and (2) a vehicle position system.

In some embodiments, the ego vehicle uses its GPS unit to track its own geographic position to form "ego GPS data." The ego GPS data describes the geographic position of the ego vehicle. The ego GPS data may describe the geographic position of the ego vehicle over a plurality of points in time. The ego GPS data has an accuracy of plus or minus 10 meters relative to the actual geographic position of the ego vehicle.

In some embodiments, the remote vehicle uses its GPS unit to track its own geographic position to form "remote GPS data." The remote GPS data describes the geographic position of the remote vehicle. The remote GPS data may describe the geographic position of the remote vehicle over a plurality of points in time. The remote GPS data has an accuracy of plus or minus 10 meters relative to the actual geographic position of the remote vehicle.

In some embodiments, the remote vehicle includes a sensor set. The sensor set includes one or more onboard vehicle sensors such as GPS, radar, LIDAR, cameras, etc. The vehicle position system of the remote vehicle may cause one or more of the sensors included in the sensor set to identify and track the position of the ego vehicle. This identification and tracking produces sensor data that describes the position or orientation of the ego vehicle relative to the geographic position of the remote vehicle. The vehicle position system of the remote vehicle may analyze the sensor data to calculate the following: angle data describing an angle separating the remote vehicle from the ego vehicle; and range data describing a range separating the remote vehicle from the ego vehicle. The vehicle position system of the remote vehicle may combine the remote GPS data, the angle data and the range data to generate relative position data. The relative position data describes the geographic location or position of the ego vehicle relative to the remote vehicle.

In some embodiments, the remote vehicle includes a communication unit that includes hardware or software that is operable to send and receive wireless transmissions via a network. For example, the communication unit may enable the remote vehicle to send and receive wireless messages via one or more of the following wireless communication standards: DSRC; Long-Term Evolution Vehicle-to-X ("LTE-V2X") or some other cellular-based communication (e.g., 3G, 4G, LTE, etc.); millimeter wave communication; half-duplex communication; full-duplex communication; etc. The communication unit of the remote vehicle transmits a wireless message including the relative position data and the remote GPS data to the network via one of the wireless communication standards supported by the communication unit.

In some embodiments, the ego vehicle also includes a communication unit having similar functionality as the one described in the preceding paragraph with reference to the remote vehicle. The communication unit of the ego vehicle receives, from the network, the wireless message transmitted by the communication unit of the remote vehicle. In this way the ego vehicle acquires the relative position data and the remote GPS data from the remote vehicle.

The vehicle position system of the ego vehicle includes a filtering module. In some embodiments, the filtering module includes code and routines that are operable, when executed by a processor of the ego vehicle, to produce positioning information describing the geographic position of the ego vehicle with an accuracy of plus or minus 1.5 meters, or better, relative to the actual geographic position of the ego vehicle based on two or more data sets that describe the geographical position or location of the ego vehicle from two or more different perspectives such as (1) the perspective of the ego vehicle and (2) the perspective of the remote vehicle.

In some embodiments, the geographical position of the ego vehicle from the perspective of the ego vehicle is described by the ego GPS data since this data is recorded from the perspective of the ego vehicle.

In some embodiments, the vehicle position system of the ego vehicle estimates the geographic position of the ego vehicle from the perspective of the remote vehicle based on the relative position data and the remote GPS data which was included in the wireless message received from the network. This produces the ego position estimate. For example, because the relative position data describes the geographic position of the ego vehicle relative to the geographic position of the remote vehicle, which is described by the remote GPS data, the vehicle position system of the ego vehicle is able to use the relative position data and the remote GPS data to estimate the geographic position of the ego vehicle based on the relative position data and the remote GPS data which were recorded from the perspective of the remote vehicle.

In some embodiments, the vehicle position system provides the ego GPS data and the ego position estimate as inputs to the filtering module and then executes the filtering module using the processor of the ego vehicle. When executed by the processor, the filtering module causes the processor to fuse the ego GPS data and the ego position estimate to form fused data that describes an improved estimate of the geographic position of the ego vehicle. Our research shows that the fused data describes the geographic position or location of the ego vehicle with an accuracy of plus or minus 1.5 meters, or better, relative to the actual geographic position of the ego vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for an ego vehicle including an ADAS system and a GPS unit, the method including: receiving a wireless message from a network, where the wireless message includes remote GPS data and relative position data associated with a remote vehicle; determining ego estimate data based on the remote GPS data and the relative position data, where the ego estimate data describes a first geographical location of the ego vehicle from a first perspective of the remote vehicle; and fusing the ego estimate data and ego GPS data to form fused data, where the ego GPS data is retrieved by the GPS unit of the ego vehicle and describes a second geographical location of the ego vehicle from a second perspective of the ego vehicle and the fused data describes a third geographical location of the ego vehicle with an accuracy of at least substantially plus or minus 1.5 meters relative to an actual geographic location of the ego vehicle. Other embodiments of this aspect include corresponding computer systems, apparatus, and computer programs recorded on one or more computer storage devices, each configured to perform the actions of the methods.

Implementations may include one or more of the following features. The method where the ADAS system provides its functionality based on a positional information input describing a geographical position of the ego vehicle with an accuracy of at least substantially plus or minus 1.5 meters relative to an actual geographic position of the ego vehicle and the method further includes: inputting the fused data to the ADAS system as the positional information input for the ADAS system; and executing the ADAS system using the fused data as the positional information input for the ADAS system. The method where the ADAS system provides safety functionality for the ego vehicle. The method where the GPS unit is a conventional GPS unit and the ego GPS data has an accuracy of plus or minus 10 meters relative to the actual geographic location of the ego vehicle. The method where the remote GPS data describes a geographical location of a remote vehicle. The method where the relative position data includes range data and angle data and the relative position data describes a location of the ego vehicle relative to the remote vehicle as measured by one or more sensors of the remote vehicle based on (1) a range separating the ego vehicle from the remote vehicle as described by the range data and (2) an angle separating the ego vehicle from the remote vehicle as described by the angle data. The method may also include the wireless message is transmitted via cellular communication. The method where the wireless message is transmitted by the remote vehicle and the wireless message is one of a DSRC message and a cellular message. The method where the wireless message is relayed to the ego vehicle by an RSU. Implementations of the described techniques may include hardware, a method or process, or computer software on a computer-accessible medium.

One general aspect includes a system including an ego vehicle, the ego vehicle including: an ADAS system; a GPS unit; and an onboard vehicle computer system that is communicatively coupled to the ADAS system and the GPS unit, the onboard vehicle computer system including a non-transitory memory storing computer code which, when executed by the onboard vehicle computer system causes the onboard vehicle computer system to: determine ego estimate data based on remote GPS data and relative position data, where the remote GPS data describes a geographical location of a remote vehicle and the relative position data describes a location of the ego vehicle relative to the remote vehicle as measured by the remote vehicle; and fuse the ego estimate data and ego GPS data to form fused data, where the ego estimate data describes a first geographical location of the ego vehicle from a first perspective of the remote vehicle and the ego GPS data is retrieved by the GPS unit of the ego vehicle and describes a second geographical location of the ego vehicle from a second perspective of the ego vehicle and the fused data describes a third geographical location of the ego vehicle. Other embodiments of this aspect include corresponding computer systems, apparatus, and computer programs recorded on one or more computer storage devices, each configured to perform the actions of the methods.

Implementations may include one or more of the following features. The system where the fused data describes the third geographical location of the ego vehicle with an accuracy of at least substantially plus or minus 1.5 meters relative to an actual geographic location of the ego vehicle. The system where the ADAS system provides its functionality based on a positional information input describing a geographical position of the ego vehicle with an accuracy of at least substantially plus or minus 1.5 meters relative to an actual geographic position of the ego vehicle and the non-transitory memory stores further computer-executable code that, when executed by the onboard vehicle computer system, causes the onboard vehicle computer system to: input the fused data to the ADAS system as the positional information input for the ADAS system; and execute the ADAS system using the fused data as the positional information input for the ADAS system. The system where the remote GPS data and the relative position data are included in wireless message that is transmitted to the ego vehicle by the remote vehicle. The system where the wireless message is a DSRC message. The system where the wireless message is a full-duplex wireless message. The system where the wireless message is a millimeter wave message. The system where the wireless message is a LTE-V2X message. Implementations of the described techniques may include hardware, a method or process, or computer software on a computer-accessible medium.

One general aspect includes a computer program product including a non-transitory memory of an onboard vehicle computer system of an ego vehicle storing computer-executable code that, when executed by a processor, causes the processor to: determine ego estimate data based on remote GPS data and relative position data, where the remote GPS data describes a geographical location of a remote vehicle and the relative position data describes a location of the ego vehicle relative to the remote vehicle as measured by one or more sensors of the remote vehicle; and fuse the ego estimate data and ego GPS data to form fused data, where the ego estimate data describes a first geographical location of the ego vehicle from a first perspective of the one or more sensors of a remote vehicle and the ego GPS data is retrieved by a GPS unit of the ego vehicle and describes a second geographical location of the ego vehicle from a second perspective of the ego vehicle and the fused data describes a third geographical location of the ego vehicle. Other embodiments of this aspect include corresponding computer systems, apparatus, and computer programs recorded on one or more computer storage devices, each configured to perform the actions of the methods.

Implementations may include one or more of the following features. The computer program product where the fused data describes the third geographical location of the ego vehicle with an accuracy of at least substantially plus or minus 1.5 meters relative to an actual geographic location of the ego vehicle. The computer program product where the ego vehicle includes an ADAS system and the ADAS system provides its functionality based on a positional information input describing a geographical position of the ego vehicle with an accuracy of at least substantially plus or minus 1.5 meters relative to an actual geographic position of the ego vehicle and the non-transitory memory stores further computer-executable code that, when executed by the processor, causes the processor to: input the fused data to the ADAS system as the positional information input for the ADAS system; and execute the ADAS system using the fused data as the positional information input for the ADAS system. The computer program product where remote GPS data and the relative position data are received via a wireless message received from a network and transmitted by a remote electronic device. The wireless message where the wireless message further includes error estimate data that describes an estimation of an inaccuracy of the relative position data. Implementations of the described techniques may include hardware, a method or process, or computer software on a computer-accessible medium.

One general aspect includes a wireless message stored in a non-transitory memory, where the wireless message includes: remote identification ("ID") data uniquely identifying a remote vehicle; remote GPS data describing a geographical location of the remote vehicle at a selected point in time; ego id data uniquely identifying an ego vehicle; and relative position data describing (1) a distance separating the remote vehicle and the ego vehicle at the selected point in time as measured by a sensor set of the remote vehicle and (2) an angle separating the remote vehicle and the ego vehicle at the selected point in time as measured by the sensor set. Other embodiments of this aspect include corresponding computer systems, apparatus, and computer programs recorded on one or more computer storage devices, each configured to perform the actions of the methods.

Implementations may include the wireless message where the wireless message further includes error estimate data that describes an estimation of an inaccuracy of the relative position data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A is a block diagram illustrating an example of BSM data according to some embodiments.

FIG. 4B is a block diagram illustrating an example of BSM data according to some embodiments.

DETAILED DESCRIPTION

Figure 1A:
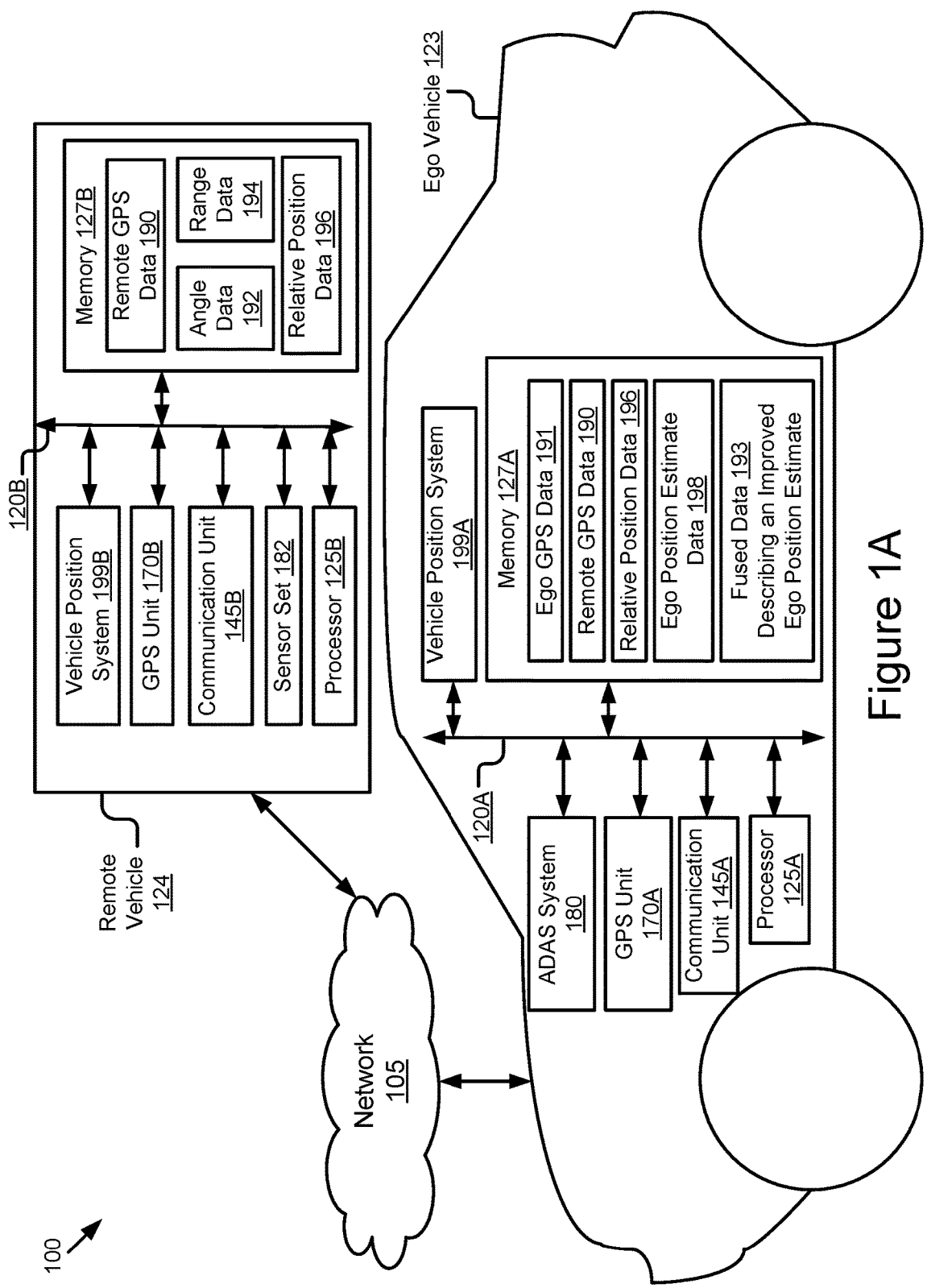
FIG. 1A is a block diagram illustrating an operating environment for a vehicle position system according to some embodiments.

A driver's vehicle may be referred to herein as an "ego vehicle." Assume that the ego vehicle includes an ADAS system. Many modern applications of ADAS systems require GPS data describing the location of the ego vehicle with lane-level accuracy. This GPS data may be an example of a positional information input, and the specification of the ADAS system may require or recommend a positional information input with lane-level accuracy, or better, in order for the ADAS system to provide its functionality or operate in conformance with its specification. Additionally, the DSRC standard requires vehicles to be able to generate positional information that describes their geographical location with lane-level accuracy. Accordingly, there is a need for vehicles to be able to generate positional information that describes their geographical location with lane-level accuracy.

GPS data provided by a conventional GPS unit is generally accurate to within plus or minus 10 meters of the actual geographical position of the vehicle. A typical lane of a roadway is about 3 meters wide, and so, lane-level accuracy means that the geographical position of the vehicle is specified with an accuracy of at least plus or minus 1.5 meters in relation to the actual position of the vehicle. Accordingly, the GPS data provided by a conventional GPS unit included in a vehicle is unable to describe the geographic location of the vehicle with lane-level accuracy.

The vehicle position system described herein solves this problem. As described below with reference to the embodiments, the vehicle position system of an ego vehicle provides fused data that describes the geographical position of the ego vehicle with an accuracy of plus or minus 1.5 meters, or better, relative to the actual geographic position of the ego vehicle Examples of a Wireless Messages Including Wireless Vehicle Data A DSRC message is an example of a wireless message that includes wireless vehicle data. There are many types of DSRC messages. One type of DSRC message is known as a Basic Safety Message ("BSM" or a "BSM message"). DSRC-equipped vehicles broadcast a BSM at a regular interval. The interval may be user adjustable. In some embodiments, the interval may be once every 0.10 seconds.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM. FIGS. 4A and 4B, which are described below, depict examples of BSM data according to some embodiments.

In some embodiments, DSRC-equipped vehicles may probe other DSRC-equipped vehicles/devices along the roadway for information describing their current and future conditions, including their path history, future path and remote sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

Another type of wireless message is a full-duplex wireless message described in U.S. patent application Ser. No. 14/471,387 filed on Aug. 28, 2014 and entitled "Full-Duplex Coordination System," the entirety of which is herein incorporated by reference.

Examples of wireless vehicle data are depicted in FIGS. 1B, 1C, 1D, 4A and 4B according to some embodiments. Additionally, any of the data depicted in FIG. 1A may be included in a wireless message transmitted by one or more vehicles, and so, this data too may be examples of wireless vehicle data according to some embodiments.

Examples of Lane-Level Accuracy

Vehicles are also increasingly manufactured to include GPS-based navigation systems. A GPS-based navigation system may provide navigation routes to a driver that are based on GPS data and knowledge about queue lengths along roadways.

Lane-level accuracy may mean that the location of a vehicle is described so accurately that the vehicle's lane of travel may be accurately determined. The specification for some ADAS systems recommend or require a positional information input with lane-level accuracy in order for the ADAS system to provide their functionality or operate in conformance with the specification for the ADAS system.

ADAS System

Examples of an ADAS system may include one or more of the following elements of an ego vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in the ego vehicle that makes that ego vehicle be an autonomous vehicle or a semi-autonomous vehicle.

Example Overview

Referring to FIG. 1A, depicted is an operating environment 100 for a first vehicle position system 199A and a second vehicle position system 199B. The first vehicle position system 199A and the second vehicle position system 199B may be referred to collectively or individually as the "vehicle position system 199."

The operating environment 100 may include one or more of the following elements: an ego vehicle 123; and a remote vehicle 124. These elements of the operating environment 100 may be communicatively coupled to a network 105. Although not depicted in FIG. 1A, the operation environment 100 may include one or more RSUs that are DSRC-enabled (see, e.g., the RSU 104 depicted in FIG. 1D). The one or more DSRC-enabled RSUs may relay wireless messages among the ego vehicle 123 and the remote vehicle 124 via the network 105. For example, the range of DSRC transmissions is generally about 500 meters, and so, if the remote vehicle 124 is 700 meters away from the ego vehicle 123, then one or more intervening DSRC-enabled RSUs may relay a DSRC message from the remote vehicle 124 to the ego vehicle 123 or from the ego vehicle 123 to the remote vehicle 124.

Although one ego vehicle 123, one remote vehicle 124 and one network 105 are depicted in FIG. 1A, in practice the operating environment 100 may include one or more ego vehicles 123, one or more remote vehicles 124 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

In some embodiments, one or more of the ego vehicle 123 and the remote vehicle 124 may be DSRC-equipped vehicles. The network 105 may include one or more communication channels shared among the ego vehicle 123, the remote vehicle 124 and one or more RSUs. The communication channel may include DSRC, LTE-V2X, full-duplex wireless communication or any other wireless communication protocol. For example, the network 105 may be used to transmit a DSRC message, DSRC probe or BSM including any of the data described herein.

The ego vehicle 123 and the remote vehicle 124 may include the same or similar elements. The ego vehicle 123 and the remote vehicle 124 may share a connection or association. For example, the ego vehicle 123 and the remote vehicle 124 may share a common manufacturer (e.g., Toyota) and the functionality described herein may only be provided to vehicles sharing this common manufacturer.

The ego vehicle 123 and the remote vehicle 124 may be any type of vehicle. The ego vehicle 123 and the remote vehicle 124 may be the same type of vehicle relative to one another or different types of vehicles relative to one another. For example, either the ego vehicle 123 or the remote vehicle 124 may include one of the following types of vehicles: a car; a truck; a sports utility vehicle; a bus; a semi-truck; a drone or any other roadway-based conveyance.

In some embodiments, one or more of the ego vehicle 123 and the remote vehicle 124 may include an autonomous vehicle or a semi-autonomous vehicle. For example, one or more of the ego vehicle 123 and the remote vehicle 124 may include an ADAS system 180. The ADAS system 180 may provide some or all of the functionality that provides autonomous functionality.

The ego vehicle 123 may include one or more of the following elements: a processor 125A; a memory 127A; a communication unit 145A; a GPS unit 170A; an ADAS system 180; and a vehicle position system 199A. These elements of the ego vehicle 123 may be communicatively coupled to one another via a bus 120A.

The remote vehicle 124 includes, among other things, one or more of the following elements communicatively coupled to one another via a bus 120B: a processor 125B; a memory 127B; a communication unit 145B; a GPS unit 170B; and a vehicle position system 199B. As described below, the remote vehicle 124 also includes a sensor set 182.

The bus 120A of the ego vehicle 123 and the bus 120B of the remote vehicle may be referred to herein collectively or individually as the "bus 120" since, for example, the bus 120 of the ego vehicle 123 provides similar functionality to the components of the ego vehicle 123 as does the bus 120 of the remote vehicle 124. For similar reasons, the description provided herein uses the following terms when referring to elements that are common to the ego vehicle 123 and the remote vehicle 124 and provide similar functionality to the ego vehicle 123 or the remote vehicle 124: the "processor 125" when referring to the processor 125A and the processor 125B, collectively or individually; the "memory 127" when referring to the memory 127A and the memory 127B, collectively or individually; the "communication unit 145" when referring to the communication unit 145A and the communication unit 145B, collectively or individually; the "GPS unit 170" when referring to the GPS unit 170A and the GPS unit 170B, collectively or individually; and the "vehicle position system 199" when referring to the vehicle position system 199A and the vehicle position system 199B, collectively or individually.

The ego vehicle 123 and the remote vehicle 124 are now described.

Ego Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the vehicle position system 199. The onboard vehicle computer system may be operable to access and execute the data stored on the memory 127 to provide the functionality described herein for the vehicle position system 199 or its elements (see, e.g., FIG. 2).

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 and the remote vehicle 124 may each include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 and the remote vehicle 124 may each include one or more memories 127.

The memory 127 of the ego vehicle 123 may store one or more of the following elements: the ego GPS data 191; the remote GPS data 190; the relative position data 196; the ego position estimate data 198; and the fused data 193.

The ego GPS data 191 describes the geographic location of the ego vehicle 123. For example, the ego GPS data 191 describes a longitude and latitude of the ego vehicle 123. The ego GPS data 191 may be retrieved by a conventional GPS unit of the ego vehicle 123. For example, the GPS unit 170 of the ego vehicle 123 retrieves the ego GPS data 191 from one or more GPS satellites and the vehicle position system 199 of the ego vehicle 123 causes the processor 125 of the ego vehicle 123 to store the ego GPS data 191 on the memory 127 of the ego vehicle 123.

The remote GPS data 190 describes the geographic location of the remote vehicle 124. For example, the remote GPS data 190 describes a longitude and latitude of the remote vehicle 124. The remote GPS data 190 may be retrieved by a conventional GPS unit of the remote vehicle 124. For example, the GPS unit 170 of the remote vehicle 124 retrieves the remote GPS data 190 from one or more GPS satellites and the vehicle position system 199 of the remote vehicle 124 causes the processor 125 of the remote vehicle 124 to store the remote GPS data 190 on the memory 127 of the remote vehicle 124. As will be described in more detail below, the vehicle position system 199 of the remote vehicle 124 may cause the communication unit 145 of the remote vehicle 124 to generate a wireless message that includes the remote GPS data 190; the communication unit 145 of the remote vehicle 124 may transmit the wireless message to the ego vehicle 123 via the network 105. The vehicle position system 199 of the ego vehicle 123 may store the remote GPS data 190 on the memory 127 of the ego vehicle 123.

The relative position data 196 describes the geographic position of the ego vehicle 123 relative to the geographic position of the remote vehicle 124. The relative position data 196 is determined by the vehicle position system 199 of the remote vehicle 124 and then wirelessly transmitted to the ego vehicle 123 via the network 105. The relative position data 196 may be included in the same wireless message that includes the remote GPS data 190.

In some embodiments, the relative position data 196 may include one or more of the following elements: the range data 194; and the angle data 192.

In some embodiments, the relative position data 196 may include one or more of the following elements: the remote GPS data 190; the range data 194; and the angle data 192.

An example of the vehicle position system 199 of the remote vehicle 124 determining the relative position data 196 is now described according to some embodiments. The remote vehicle 124 includes a sensor set 182. The sensor set 182 includes one or more onboard sensors. The sensor set 182 may include sensors such as LIDAR, radar, cameras and other sensors that may determine one or more of the following: (1) the range data 194 describing a range or distance separating the ego vehicle 123 from the remote vehicle 124 as measured by one or more sensors of the sensor set 182 (e.g., LIDAR, radar or some other sensor that is operable to determine a range between two objects); and (2) angle data 192 describing an angle between a geographical location of the ego vehicle 123 at a point in time and the geographical location of the remote vehicle 124 at the same or substantially same point in time. The angle data 192 may also describe a heading of the remote vehicle 124. Because the remote GPS data 190 describes the geographic location of the remote vehicle 124, the combination of the remote GPS data 190, the range data 194 and the angle data 192, when recorded at a same time or substantially same time, are sufficient to describe the geographic position of the ego vehicle 123 relative to the geographic position of the remote vehicle 124.

In some embodiments, a range finding sensor of the sensor set 182 may be operable to record the angle data 192. For example, a LIDAR camera or some other range finding sensor may be operable to record the range data 194 and the angle data 192.

In some embodiments, a camera may be mounted on the remote vehicle 124 and it may capture images of the ego vehicle 123 that are used by the vehicle position system 199 of the remote vehicle 124 to determine the angle data 192. For example, the camera may capture an image that depicts the ego vehicle 123. The orientation of the camera as it is mounted on the remote vehicle 124 is known so that the angle between the ego vehicle 123 and the remote vehicle 124 may be determined from the image.

In some embodiments, the angle described by the angle data 192 may be relative to quantifiable location or direction that is relevant to determining an angle between the remote vehicle 124 and the ego vehicle 123 such as a constant direction (e.g., north, south, east, west, etc.) or a dynamic direction (e.g., the heading of remote vehicle 124 or some other dynamic object whose heading is known to the vehicle position system 199 of the remote vehicle 124). For example, since the heading of the remote vehicle 124 is known to the vehicle position system 199 of the remote vehicle 124, the angle data 192 may describe an angle between an approximate center of the ego vehicle 123 and the heading of the remote vehicle 124.

In some embodiments, the relative position data 196 may be determined by the relative position module 206 (not pictured) of the vehicle position system 199. The relative position module 206 is described in more detail below with reference to FIG. 2.

The ego position estimate data 198 describes an estimate of the geographical position of the ego vehicle 123 which is determined by the vehicle position system 199 of the ego vehicle 123 based on the sensor-based observations of the remote vehicle 124. For example, the vehicle position system 199 of the ego vehicle determines the ego position estimate data 198 based on the relative position data 196.

An example of the vehicle position system 199 of the ego vehicle 123 determining the ego position estimate data 198 is now described according to some embodiments. The memory 127 of the ego vehicle 123 may store data that describes the geographic position of the remote vehicle 124. For example, the memory 127 of the ego vehicle 123 stores the remote GPS data 190. In some embodiments, the vehicle position system 199 of the ego vehicle 123 may determine the ego position estimate data 198 by calculating a point in space (e.g., a latitude and longitude) that is (1) located a distance from the geographic location of the remote vehicle 124 that is equal (or substantially equal) to the distance described by the range data 194 included in the relative position data 196 and (2) at an angle relative to the heading of the remote vehicle 124 (or some other direction used to calculate the angle data 192) that is equal (or substantially equal) to the angle described by the angle data 192 that is included in the relative position data 196. This point in space is described by the ego position estimate data 198 and is an estimate of the geographic position of the ego vehicle 123 as determined by the vehicle position system 199 of the ego vehicle 123 based on the sensor-based observations of the remote vehicle 124 which, as described above, are recorded from the perspective of the remote vehicle 124.

In some embodiments, the ego estimate data 198 may be determined by the estimate module 208 (not pictured) of the vehicle position system 199. The estimate module 208 is described in more detail below with reference to FIG. 2.

The vehicle position system 199 of the ego vehicle 123 may include code and routines that are operable to fuse the ego GPS data 191 and the ego position estimate data 198 to form the fused data 193. The fused data 193 described an improved estimate of the geographical position of the ego vehicle 123. Our research shows that the fused data 193 describes the geographic position or location of the ego vehicle 123 with an accuracy of plus or minus 1.5 meters, or better, relative to the actual geographic position of the ego vehicle 123.

The data included in the memory 127 of the ego vehicle 123 is described in more detail below with reference to FIGS. 1B and 1C.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The GPS unit 170 may include hardware that wirelessly communicates with a GPS satellite to retrieve data that describes a geographic location of the ego vehicle 123. For example, the GPS unit 170 retrieves the ego GPS data 191 from one or more GPS satellites.

The ADAS system 180 may include one or more advanced driver assistance systems. Examples of an ADAS system 180 may include one or more of the following elements of an ego vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 180 includes any hardware or software that controls one or more operations of the ego vehicle 123 so that the ego vehicle 123 is "autonomous" or "semi-autonomous."

In some embodiments, the vehicle position system 199 may include code or routines that determine the ego position estimate data 198 based on the relative position data 196 and determine the fused data 193 based on the ego position estimate data 198 and the ego GPS data 191. The vehicle position system 199 may then provide the fused data 193 to the ADAS system 180 so that the ADAS system 180 may have access to positional information that describes the geographic location of the ego vehicle with an accuracy of at least plus or minus 1.5 meters relative to the actual geographic position of the ego vehicle 123. Since the ADAS system 180 may require position information with lane-level accuracy in order to provide its functionality within its specification, the vehicle position system 199 may beneficially improve the performance of the ADAS system 180.

In some embodiments, the vehicle position system 199 of the ego vehicle 123 may be implemented using hardware including a field-programmable gate array ("FPGA") or an application-specific integrated circuit ("ASIC"). In some other embodiments, the vehicle position system 199 may be implemented using a combination of hardware and software. The vehicle position system 199 may be stored in a combination of the devices (e.g., servers or other devices), or in one of the devices.

The vehicle position system 199 is described in more detail below with reference to FIGS. 1B, 1C, 1D, 2, 3A and 3B.

Although not depicted in FIG. 1A, in some embodiments the ego vehicle 123 may include a full-duplex coordination system as described in U.S. patent application Ser. No. 14/471,387 filed on Aug. 28, 2014 and entitled "Full-Duplex Coordination System."

In some embodiments, the full-duplex coordination system of the ego vehicle 123 may receive a full-duplex wireless message that includes one or more of the remote GPS data 190 and the relative position data 196.

In some embodiments, the full-duplex coordination system of the ego vehicle 123 may transmit a full-duplex wireless message that includes one or more of the ego GPS data 191.

Figure 1B:
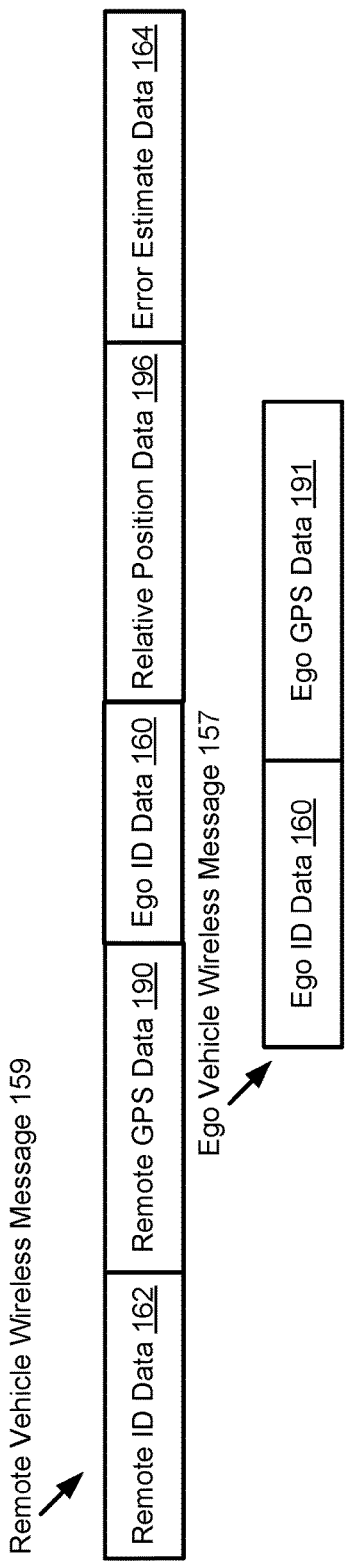
FIG. 1B is a block diagram illustrating a set of wireless vehicle messages according to some embodiments.
Figure 1C:
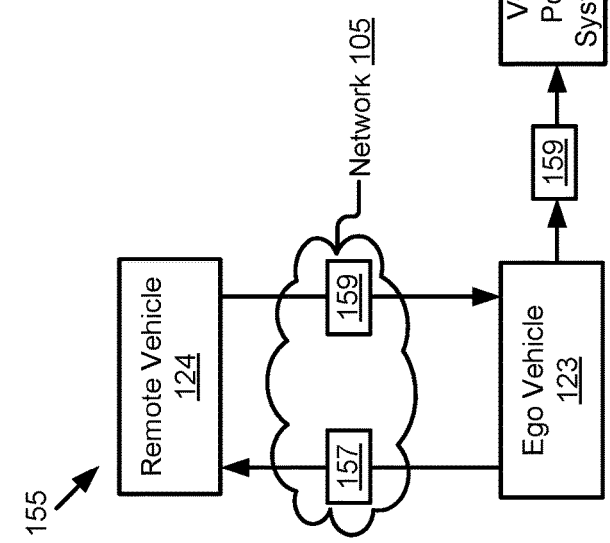
FIG. 1C is a block diagram illustrating a flow process for determining fused data according to some embodiments.

In some embodiments, the full-duplex coordination system of the ego vehicle 123 may transmit an ego vehicle wireless message 157 (e.g., as depicted in FIGS. 1B and 1C) as a full-duplex wireless message.

In some embodiments, the full-duplex coordination system of the ego vehicle 123 may receive a remote vehicle wireless message 159 (e.g., as depicted in FIGS. 1B and 1C) which were transmitted by the remote vehicle 124 as a full-duplex wireless message.

Remote Vehicle 124

The following elements of the remote vehicle 124 are the same or similar to those described above for the ego vehicle 123, and so, the descriptions of these elements will not be repeated here: the processor 125; the memory 127; the communication unit 145; and the GPS unit 170.

The memory 127 of the remote vehicle 124 stores one or more of the following elements: the remote GPS data 190; the angle data 192; the range data 194; and the relative position data 196. These elements stored in a memory 127 of the remote vehicle 124 were described above with reference to the ego vehicle 123, and so, their descriptions will not be repeated here.

The remote vehicle 124 may include a sensor set 182. The sensor set 182 may include one or more sensors that are operable to measure the physical environment outside of the remote vehicle 124. For example, the sensor set 182 may record one or more physical characteristics of the physical environment that is proximate to the remote vehicle 124. The sensors of the sensor set 182 may generate sensor data. The sensor data may describe the recordings measured by the sensor set 182. The sensor data may be stored on the memory 127 of the remote vehicle 124. The physical environment outside of the remote vehicle 124 may include the ego vehicle 123, and so, one or more of the sensors of the sensor set 182 may record sensor data that describes information about the ego vehicle 123.

In some embodiments, the sensor set 182 may include one or more of the following vehicle sensors: a camera; a LIDAR sensor; a radar sensor; a laser altimeter; a navigation sensor (e.g., a global positioning system sensor of the GPS unit 170); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the ego vehicle 123 may include a sensor set 182 similar to the remote vehicle 124.

One or more sensors of the sensor set 182 may be operable to record sensor data that describes one or more locations of the ego vehicle 123 at one or more different times; this data may be timestamped to indicate the time when the ego vehicle 123 was at this particular location.

One or more sensors of the sensor set 182 may be operable to record one or more of the angle data 192 and the range data 194 as described above with reference to the ego vehicle 123.

The vehicle position system 199 of the remote vehicle 124 may include hardware or software that is operable to provide the same or similar functionality as the vehicle position system of the ego vehicle 123.

In some embodiments, the vehicle position system 199 of the remote vehicle 124 may be operable to cause one or more sensors of the sensor set 182 to record the angle data 192 and the range data 194. The vehicle position system 199 of the remote vehicle 124 may also be operable to cause the GPS unit 170 of the remote vehicle 124 to retrieve the remote GPS data 190 at a time that is the same or proximate to when the angle data 192 and the range data 194 were recorded by the sensor set 182. The vehicle position system 199 of the remote vehicle 124 may include code and routines that are operable to determine the relative position data 196 based on one or more of the remote GPS data 190, the angle data 192 and the range data 194.

As described in more detail below with reference to FIGS. 1B and 1C, in some embodiments the vehicle position system 199 of the remote vehicle 124 may receive a wireless message from the network 105 that includes data that describes the ego GPS data 191. The vehicle position system 199 of the remote vehicle 124 may include code and routines that are operable to determine the relative position data 196 based on one or more of the remote GPS data 190, the ego GPS data 191, the angle data 192 and the range data 194.

In some embodiments, the vehicle position system 199 of the remote vehicle 124 may be operable to form a wireless message that includes one or more of the remote GPS data 190 and the relative position data 196 and cause the communication unit 145 of the remote vehicle 124 to transmit the wireless message to the network 105.

In some embodiments, the vehicle position system 199 of the remote vehicle 124 and the ego vehicle 123 may be identical.

In some embodiments, the vehicle position system 199 of the remote vehicle 124 may be implemented using hardware including an FPGA or an ASIC. In some other embodiments, the vehicle position system 199 may be implemented using a combination of hardware and software. The vehicle position system 199 may be stored in a combination of the devices (e.g., servers or other devices), or in one of the devices.

The vehicle position system 199 is described in more detail below with reference to FIGS. 1B, 1C, 1D, 2, 3A and 3B.

Although not depicted in FIG. 1A, in some embodiments the remote vehicle 124 may include a full-duplex coordination system as described in U.S. patent application Ser. No. 14/471,387 filed on Aug. 28, 2014 and entitled "Full-Duplex Coordination System."

In some embodiments, the full-duplex coordination system of the remote vehicle 124 may receive a full-duplex wireless message that includes the ego GPS data 191.

In some embodiments, the full-duplex coordination system of the remote vehicle 124 may transmit a full-duplex wireless message that includes one or more of the remote GPS data 190 and the relative position data 196.

In some embodiments, the full-duplex coordination system of the remote vehicle 124 may receive the ego vehicle wireless message 157 (e.g., as depicted in FIGS. 1B and 1C) which was transmitted by the ego vehicle 123 as a full-duplex wireless message.

In some embodiments, the full-duplex coordination system of the remote vehicle 124 may transmit the remote vehicle wireless message 159 (e.g., as depicted in FIGS. 1B and 1C) as a full-duplex wireless message.

Referring now to FIG. 1B, depicted is a block diagram illustrating a remote vehicle wireless message 159 and an ego vehicle wireless message 157 according to some embodiments.

The ego vehicle wireless message 157 may be transmitted by the ego vehicle 123 to the network 105. The remote vehicle wireless message 159 may be transmitted by the remote vehicle 124 to the network 105.

In some embodiments, one or more of the remote vehicle wireless message 159 and the ego vehicle wireless message may be transmitted to the network 105 via any wireless communication protocol, including, for example, DSRC, LTE-V2X (or any other cellular-based communication), full-duplex wireless communication, millimeter wave communication, etc.

The remote vehicle 124 may receive one or more ego vehicle wireless messages 157 via the network 105. In some embodiments, the remote vehicle wireless message 159 may include wireless vehicle data that was received in the ego vehicle wireless message 157. For example, the ego vehicle wireless message 157 may include one or more of the following elements which may be included in the remote vehicle wireless message 159: ego ID data 160; and ego GPS data 191.

The ego ID data 160 may uniquely identify the ego vehicle 123 which transmitted the ego vehicle wireless message 157.

The ego GPS data 191 may describe the geographical location of the ego vehicle 123 which is identified by the ego ID data 160.

In some embodiments, the ego ID data 160 and the ego GPS data 191 included in a particular ego vehicle wireless message 157 may be an associated pair. The remote vehicle 124 may receive may receive a plurality of ego vehicle wireless messages 157 from one or more different ego vehicles 123 over time. The ego ID data 160 for a particular ego vehicle 123 may be constant over time. Since each ego vehicle wireless message 157 may include an instance of ego ID data 160 which is associated with an instance of ego GPS data 191, and since the ego ID data 160 for a particular ego vehicle may be constant over time, the ego ID data 160 beneficially enables the vehicle position system 199 of the remote vehicle 124 to track the geographic location of the ego vehicle 123 (as described by the ego GPS data 191) as it changes over time.

The remote vehicle 124 may respond to one or more ego vehicle wireless messages 157 by transmitting a remote vehicle wireless message 159 to an ego vehicle 123 which has previously transmitted the one or more ego vehicle wireless messages 157.

In some embodiments, the remote vehicle wireless message 159 may be received by the ego vehicle 123 from the network 105.

The remote vehicle wireless message 159 may include wireless vehicle data. For example, the remote vehicle wireless message 159 may include one or more of the following elements: remote ID data 162 which uniquely identifies the remote vehicle 124 that transmits the remote vehicle wireless message 159; remote GPS data 190 that describes the geographic position or location of the remote vehicle 124 identified by the remote ID data 162 at a time that corresponds to the relative position described by relative position data 196; the ego ID data 160 for the ego vehicle 123 which is intended to receive the remote vehicle wireless message 159; relative position data 196 describing the relative position of the ego vehicle 123 identified by the ego ID data 160 and remote vehicle 124 identified by the remote ID data 162 at the time that the remote GPS data 190 was recorded for the remote vehicle 124; and error estimate data 164. The ego GPS data 191 and the relative position data 196 were described above with reference to FIG. 1A, and so, those descriptions will not be repeated here. The ego ID 160 was described above with reference to the ego vehicle wireless message 157.

The remote ID data 162 may uniquely identify the remote vehicle 124 which transmitted the remote vehicle wireless message 159. The remote ID data 162 for a particular remote vehicle 124 may remain constant over time.

Responsive to receiving one or more ego vehicle wireless messages 157 from a particular ego vehicle 123, the vehicle position system 199 of the remote vehicle 124 may determine an instances of relative position data 196 describing the position of that particular ego vehicle 123 relative to the remote vehicle 124. As described above, this relative position data 196 may describe, from the perspective of the remote vehicle 124, (1) a range or distance separating the remote vehicle 124 from the ego vehicle 123 and (2) an angle separating the remote vehicle 124 from the ego vehicle 123.

In some embodiments, the error estimate data 164 may describe an estimated error associated with the relative position data 196. For example, the sensors used to determine the range and the angle included in the relative position data 196 may have a known error rate associated with their measurements, and these error rates may be used to determine the error estimate data 164 which describes an estimate of the likelihood that the relative position data 196, or its constituent parts (e.g., the range and the angle), are erroneous. In this way, the vehicle position system 199 of the ego vehicle 123 may use the error estimate data 164 to access whether the weight given to the relative position data 196 when calculating the ego position estimate data 198.

In some embodiments, if the estimate described by the error estimate data 164 meets or exceeds a threshold, the vehicle position system 199 of the ego vehicle 123 may ignore the relative position data 196 and determine not to form the fused data 193 or take steps to compensate for the error of the relative position data 196 when determining the fused data 193.

Optionally, the remote vehicle wireless message 159 may include the remote GPS data 190 for the remote vehicle 124 which transmits the remote vehicle wireless message 159. This may be a standalone element of the remote vehicle wireless message 159 or a component of the relative position data 196.

Referring now to FIG. 1C, depicted is a block diagram illustrating a flow process 155 for an ego vehicle to determine an instance of fused data 193 according to some embodiments.

The ego vehicle 123 may transmit an ego vehicle wireless message 157 to a remote vehicle 124 via the network 105.

Responsive to one or more ego vehicle wireless messages 157 received from the ego vehicle 123 via the network 105, the remote vehicle 124 may transmit an ego vehicle wireless message 157 to the ego vehicle 123 via the network 105. The remote vehicle wireless message 159 may include the relative position data 196 describing, from the perspective of the remote vehicle 124, the position of the ego vehicle 123 relative to the remote vehicle 124. The remote vehicle wireless message 159 may be inputted to the vehicle position system 199 of the ego vehicle 123. The vehicle position system 199 of the ego vehicle 123 may output the ego estimate data 198 based at least in part on the relative position data 196 included in the remote vehicle wireless message 159. The ego estimate data 198 may be stored in the memory 127 of the ego vehicle 123 with the ego GPS data 191. The ego estimate data 198 and the ego GPS data 191 may be inputted to the vehicle position system 199. Responsive to the ego estimate data 198 and the ego GPS data 191, the vehicle position system 199 may output fused data 193 based on both the ego estimate data 198 and the ego GPS data 191. The fused data 193 may be inputted to an ADAS system 180. The fused data 193 may be a positional information input for the ADAS system 180. The ADAS system 180 may be executed by a processor of the ego vehicle 123 using the fused data 193 as the positional information input for the ADAS system 180. The positional information input may describe a geographic location of the ego vehicle 123. The ADAS system 180 may include a specification that requires or recommends that the positional information input have lane-level accuracy.

Figure 1D:
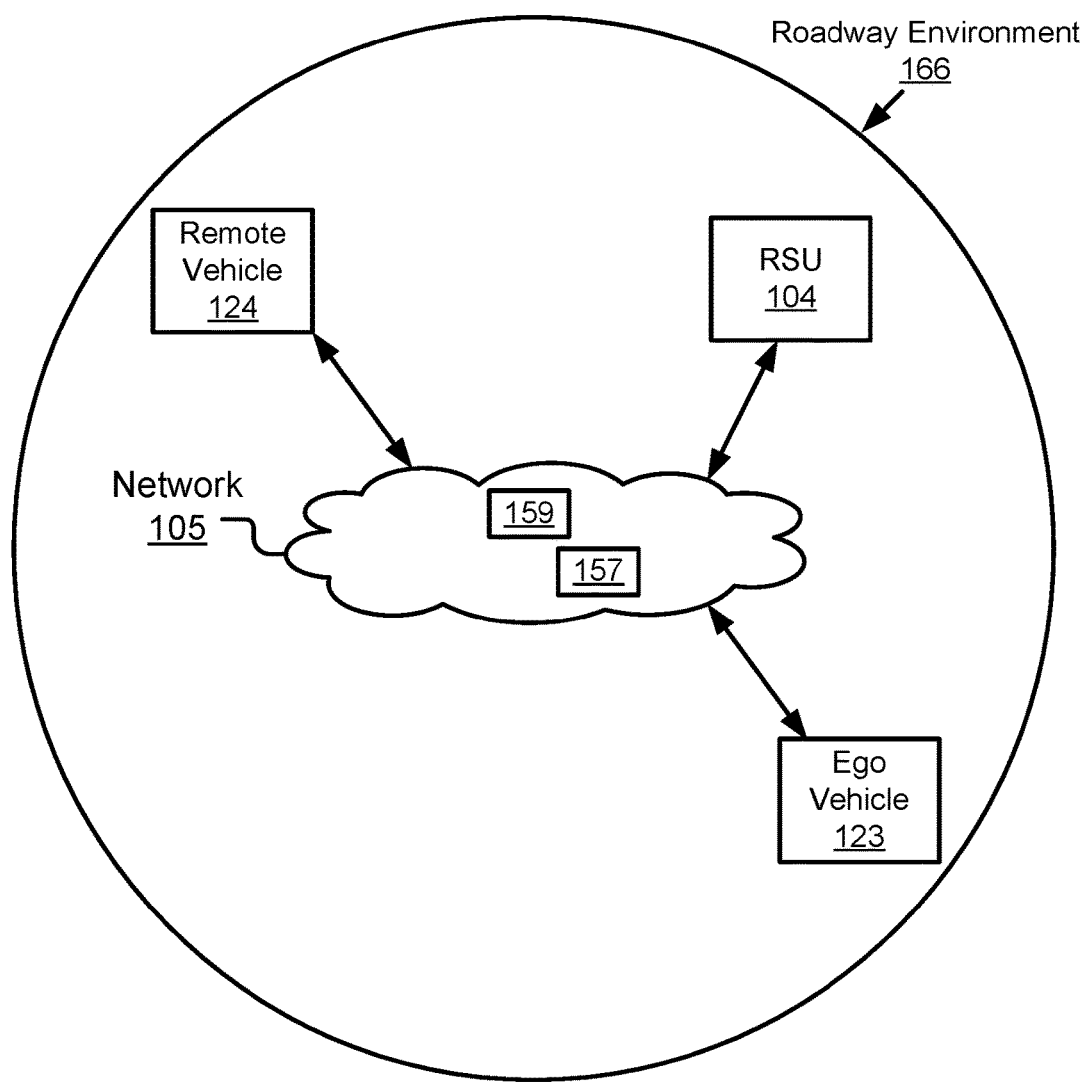
FIG. 1D is a block diagram illustrating a roadway environment for a vehicle position system according to some embodiments.

Referring now to FIG. 1D, depicted is a block diagram illustrating a roadway environment 166 according to some embodiments. The roadway environment 166 may include one or more of the following: the remote vehicle 124; an RSU 104; the network 105; and the ego vehicle 123. These entities of the roadway environment 166 may transmit one or more ego vehicle wireless messages 157 and the remote vehicle wireless message 159 via the network 105. For example, if the remote vehicle 124 is outside of DSRC range or LTE-V2V range of the ego vehicle 123, then the RSU 104 may relay the remote vehicle wireless message 159 from the remote vehicle 124 to the ego vehicle 123 via the network 105.

Figure 2:
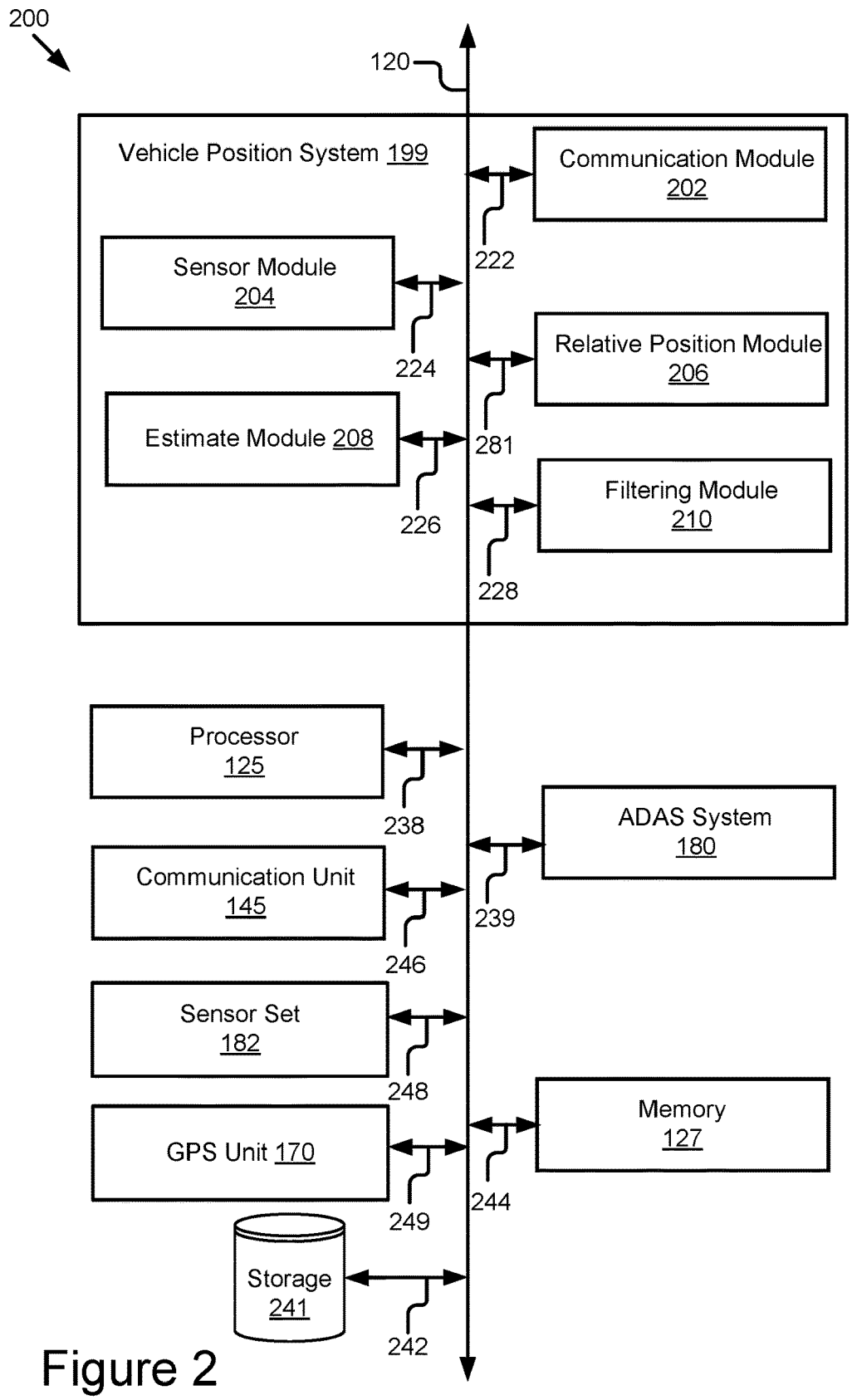
FIG. 2 is a block diagram illustrating an example computer system including a vehicle position according to some embodiments.

Referring now to FIG. 2, depicted is a block diagram illustrating an example computer system 200 including a vehicle position system 199 according to some embodiments.

In some embodiments, the computer system 200 may include a special-purpose computer system that is programmed to perform one or more steps of a method 300 described below with reference to FIG. 3A or 3B or the flow process 155 described above with reference to FIG. 1C.

In some embodiments, the computer system 200 may be an element of one or more of the ego vehicle 123 and the remote vehicle 124.

In some embodiments, the computer system 200 may be an onboard vehicle computer of one or more of the ego vehicle 123 and the remote vehicle 124.

In some embodiments, the computer system 200 may include an engine control unit, head unit or some other processor-based computing device of one or more of the ego vehicle 123 and the remote vehicle 124.

The computer system 200 may include one or more of the following elements according to some examples: the vehicle position system 199; the processor 125; the communication unit 145; the sensor set 182; the GPS unit 170; the ADAS system 180; the memory 127; and a storage 241. The components of the computer system 200 are communicatively coupled by a bus 120.

In the illustrated embodiment, the processor 125 is communicatively coupled to the bus 120 via a signal line 238. The communication unit 145 is communicatively coupled to the bus 120 via a signal line 246. The sensor set 182 is communicatively coupled to the bus 120 via a signal line 248. A GPS unit 170 is communicatively coupled to the bus 120 via a signal line 249. The ADAS system 180 is communicatively coupled to the bus 120 via a signal line 239. The storage 241 is communicatively coupled to the bus 120 via a signal line 242. The memory 127 is communicatively coupled to the bus 120 via a signal line 244.

The following elements of the computer system 200 were described above with reference to FIG. 1A, and so, those descriptions will not be repeated here: the processor 125; the communication unit 145; the sensor set 182; the GPS unit 170; the ADAS system 180; and the memory 127.

The memory 127 may store any of the data described above with reference to FIGS. 1A-1D. The memory 127 may store any data necessary for the computer system 200 to provide its functionality.

In some embodiments, the memory 127 may store BSM data 195 (not pictured). The BSM data 195 may include any data included in a BSM. The BSM data 195 may be received by the communication unit 145 as an element of a BSM. Optionally, the BSM may be formed by the communication module 202 and transmitted by the communication unit 145. The BSM data 195 may be encoded in a BSM (e.g., by the communication module 202). The BSM data 195 may be included in a BSM built by the communication module 202 and transmitted to the network 105 by the communication unit 145. Any of the data stored in the memory 127 may be included in the BSM data 195. The BSM data 195 is described in more detail below with reference to FIGS. 4A and 4B. In some embodiments, one or more of the ego vehicle wireless message 157 and the remote vehicle wireless message 159 may be transmitted as a BSM and so, they may include BSM data 195.

The storage 241 can be a non-transitory storage medium that stores data for providing the functionality described herein. The storage 241 may be a dynamic random access memory (DRAM) device, a static random access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the vehicle position system 199 includes a communication module 202, a sensor module 204, a relative position module 206; an estimate module 208; and a filtering module 210. These components of the vehicle position system 199 are communicatively coupled to each other via a bus 120. In some embodiments, components of the vehicle position system 199 can be stored in a single server or device. In some other embodiments, components of the vehicle position system 199 can be distributed and stored across multiple servers or devices. For example, some of the components of the vehicle position system 199 may be distributed across the remote vehicle 124 and the ego vehicle 123.

The communication module 202 can be software including routines for handling communications between the vehicle position system 199 and other components of the computer system 200. In some embodiments, the communication module 202 can be a set of instructions executable by the processor 125 to provide the functionality described below for handling communications between the vehicle position system 199 and other components of the computer system 200.

The communication module 202 sends and receives data, via the communication unit 145, to and from one or more elements of the operating environment 100, the roadway environment 166 or the flow process 155. For example, the communication module 202 receives or transmits, via the communication unit 145, one or more of the following elements: the remote GPS data 190; the angle data 192; the range data 194; the relative position data 196; and the ego GPS data 191. The communication module 202 may send or receive any of the data or messages described above with reference to FIG. 1A-1D via the communication unit 145.

In some embodiments, the communication module 202 receives data from components of the vehicle position system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the vehicle position system 199. For example, the communications module 202 may handle communications among the sensor module 204, the relative position module 206 and the filtering module 210. Any of these modules may cause the communication module 202 to communicate with the other elements of the computer system 200, the operating environment 100 (via the communication unit 145) or the roadway environment 166 (via the communication unit 145).

For example, the sensor module 204 may use the communication module 202 to communicate with the sensor set 182 and cause the sensor set 182 to record the sensor data used to determine the relative position data 196.

In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The sensor module 204 can be software including routines for using one or more of the sensors included in the sensor set 182 to generate sensor data. For example, the sensor module 204 may include code and routines that, when executed by the processor 125, cause the processor 125 to operate one or more of the sensors included in the sensor set 182 to record measurements of the physical environment proximate to the computer system 200 (e.g., the roadway environment 166 or the operating environment 100).

In some embodiments, the sensor module 204 may operate one or more sensors of the sensor set 182 to generate sensor data describing the measurements of the sensor set 182. The sensor module 204 may cause the sensor data to be stored in the memory 127.

In some embodiments, the sensor data may describe, for example, one or more of the following: the remote GPS data 190; the angle data 192; the range data 194; and the ego GPS data 191.

In some embodiments, the sensor module 204 may cause the GPS unit 170 to retrieve positional information for the computer system 200. For example, the computer system 200 is an element of one of the remote vehicle 124 or the ego vehicle 123 and the sensor module 204 may cause the GPS unit 170 to retrieve the remote GPS data 190 or the ego GPS data 191, respectively. The sensor module 204 may cause the communication module 202 to store the retrieved positional information in the memory 127. For example, the sensor module 204 may cause the communication module 202 to store the remote GPS data 190 or the ego GPS data 191 in the memory 127.

In some embodiments, the sensor module 204 can be stored in the memory 127 of the computer system 200 and can be accessible and executable by the processor 125. The sensor module 204 may be adapted for cooperation and communication with the processor 125 and other components of the computer system 200 via the signal line 224.

The relative position module 206 can be software including routines that, when executed by the processor 125, cause the processor 125 to implement one or more of the following steps: (1) receiving, from the communication module 202, one or more ego vehicle wireless messages 157 including ego GPS data 191 for a particular ego vehicle 123 identified by the ego ID data 160; (2) executing the GPS unit 170 to cause it to retrieve remote GPS data 190 that describes the current location of the remote vehicle 124 [which may include the computer system 200] at a particular time; (2) executing one or more sensors of the sensor set 182 to generate the angle data 192 and the range data 194; (3) parse out the ego GPS data 191 from the latest ego vehicle wireless message 157 having a particular identifier for a particular ego vehicle 123 [e.g., the ego ID data 160]; and (4) determining relative position data 196 describing the geographical position of the ego vehicle 123 associated with the ego ID data 160 relative to the remote vehicle 124.

In some embodiments, one or more of the angle data 192 or the range data 194 may be determined or verified for accuracy based on the combination of the ego GPS data 191 and the remote GPS data 190 at a particular time or time interval (e.g., the ego GPS data 191 and the remote GPS data 190 as recorded within 1 second of each other or some other time interval such as 0.1 second, 0.5 second, 5 seconds, 10 seconds, etc.) depending on the accuracy desired for the relative position data 196.

In some embodiments, the relative position module 206 can be stored in the memory 127 of the computer system 200 and can be accessible and executable by the processor 125. The relative position module 206 may be adapted for cooperation and communication with the processor 125 and other components of the computer system 200 via signal line 281.

The estimate module 208 can be software including routines that, when executed by the processor 125, cause the processor 125 to implement one or more of the following steps: (1) receive, from the communication module 202, remote GPS data 190 describing the geographic location of the remote vehicle 124; (2) receive, from the communication module 202, relative position data 196 including range data 194 and angle data 192; and (3) calculate a point in space (e.g., a latitude and longitude) that is (a) located a distance from the geographic location of the remote vehicle 124 that is equal (or substantially equal) to the distance described by the range data 194 included in the relative position data 196 and (b) at an angle relative to the heading of the remote vehicle 124 (or some other direction used to calculate the angle data 192) that is equal (or substantially equal) to the angle and the heading described by the angle data 192 that is included in the relative position data 196. This point in space is described by the ego position estimate data 198. The point in space described by the ego estimate data 198 may be an estimate of the geographic position of the ego vehicle 123 as determined by the estimate module 208 based on the sensor-based observations of the remote vehicle 124 (i.e., the angle data 192 and the range data 194) which, as described above, are recorded by the sensors of the remote vehicle 124, and so, they are recorded from the perspective of the remote vehicle 124.

In some embodiments, the estimate module 208 can be stored in the memory 127 of the computer system 200 and can be accessible and executable by the processor 125. The estimate module 208 may be adapted for cooperation and communication with the processor 125 and other components of the computer system 200 via signal line 226.

The filtering module 210 can be software including routines that, when executed by the processor 125, cause the processor 125 to implement one or more of the following steps: (1) receive, from the communication module 202, the ego GPS data 191 and the ego estimate data 198; and (2) fuse the ego GPS data 191 and the ego estimate data 198 to generate the fused data 193.

In some embodiments, the filtering module 210 may include code and routines that are operable, when executed by the processor 125, to produce fused data 193 describing the geographic position of the ego vehicle 123 with an accuracy of plus or minus 1.5 meters, or better, relative to the actual geographic position of the ego vehicle 123 based on two or more data sets that describe the geographical position or location of the ego vehicle from two or more different perspectives such as (1) the perspective of the ego vehicle 123 [i.e., the ego GPS data 191] and (2) the perspective of the remote vehicle 124 [i.e., the ego estimate data 198].

For example, according to some embodiments the filtering module 210 may include a Kalman filtering algorithm that receives the following inputs: (1) the ego GPS data 191 that describes the geographical position of the ego vehicle 123 from the perspective of the ego vehicle 123; and (2) the ego estimate data 198 that describes the geographical position of the ego vehicle 123 from the perspective of the sensors of the remote vehicle 123. Based on these inputs, the filtering module 210 may output the fused data 193. The filtering module 210 may fuse the inputs to generate the fused data 193, which is more accurate than either of the inputs with respect to describing an estimate of the geographical position of the ego vehicle 123 relative to the actual geographical position of the ego vehicle 123.

The filtering module 210 may then cause the processor 125 to provide the fused data 193 to the ADAS system 180 as an input to describe the geographical location of the ego vehicle 123. The filtering module 210 may then execute the ADAS system 180 using the fused data 193 as the input to describe the geographical location of the ego vehicle 123. The ADAS system 180 may require that the geographic location of the ego vehicle 123 be described with lane-level accuracy, which cannot be achieved by the ego GPS data 191. Since the fused data 193 describes the geographical location of the fused with lane-level accuracy, or better, the fused data 193 meets the requirements of the ADAS system 180 and therefore beneficially improves the performance of the ADAS system 180 in some embodiments.

In some embodiments, the filtering module 210 can be stored in the memory 127 of the computer system 200 and can be accessible and executable by the processor 125. The filtering module 210 may be adapted for cooperation and communication with the processor 125 and other components of the computer system 200 via signal line 228.

Figure 3A:
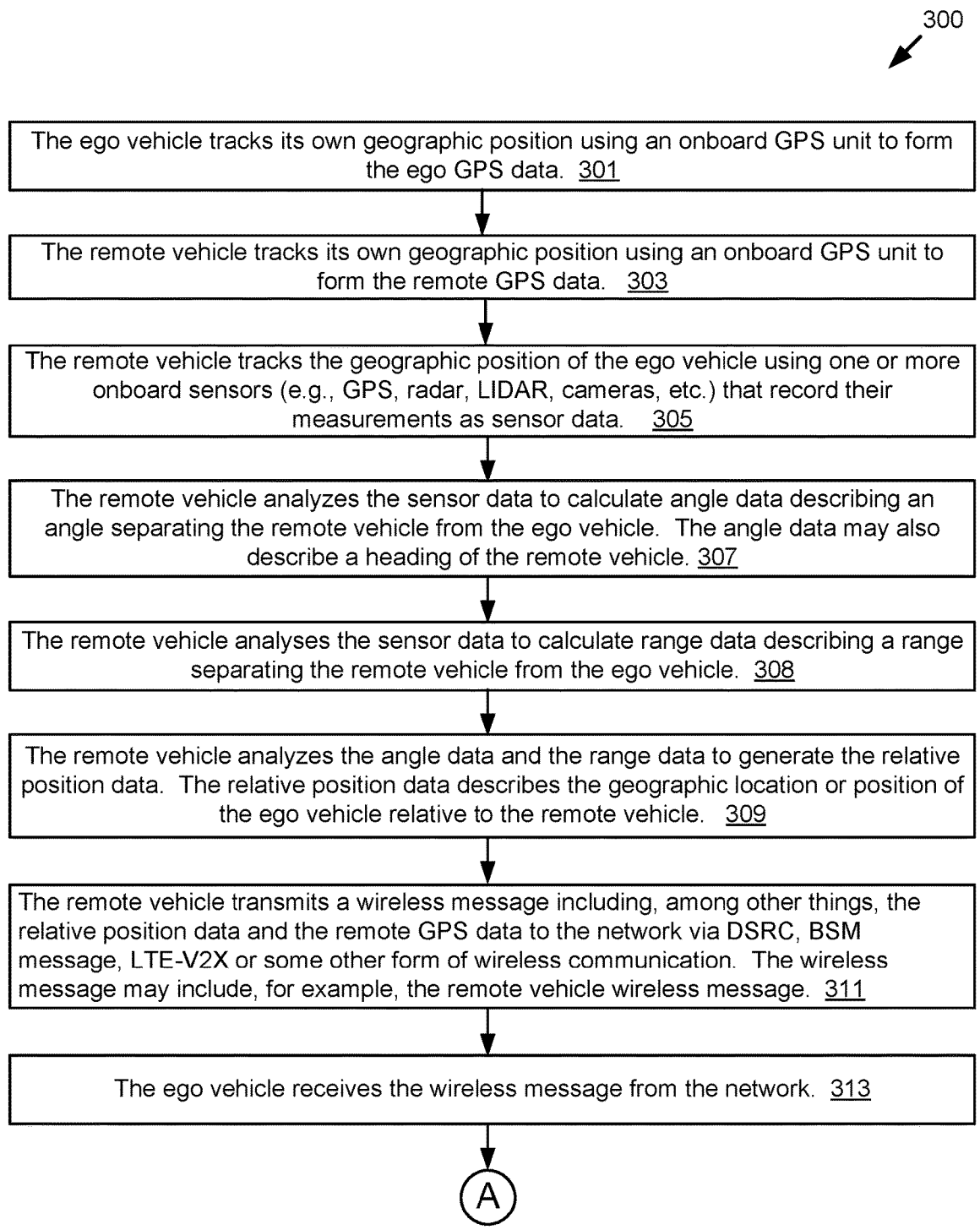
FIGS. 3A and 3B include a flowchart of an example method for determining fused data describing an improved estimate of a geographical position of an ego vehicle according to some embodiments.
Figure 3B:
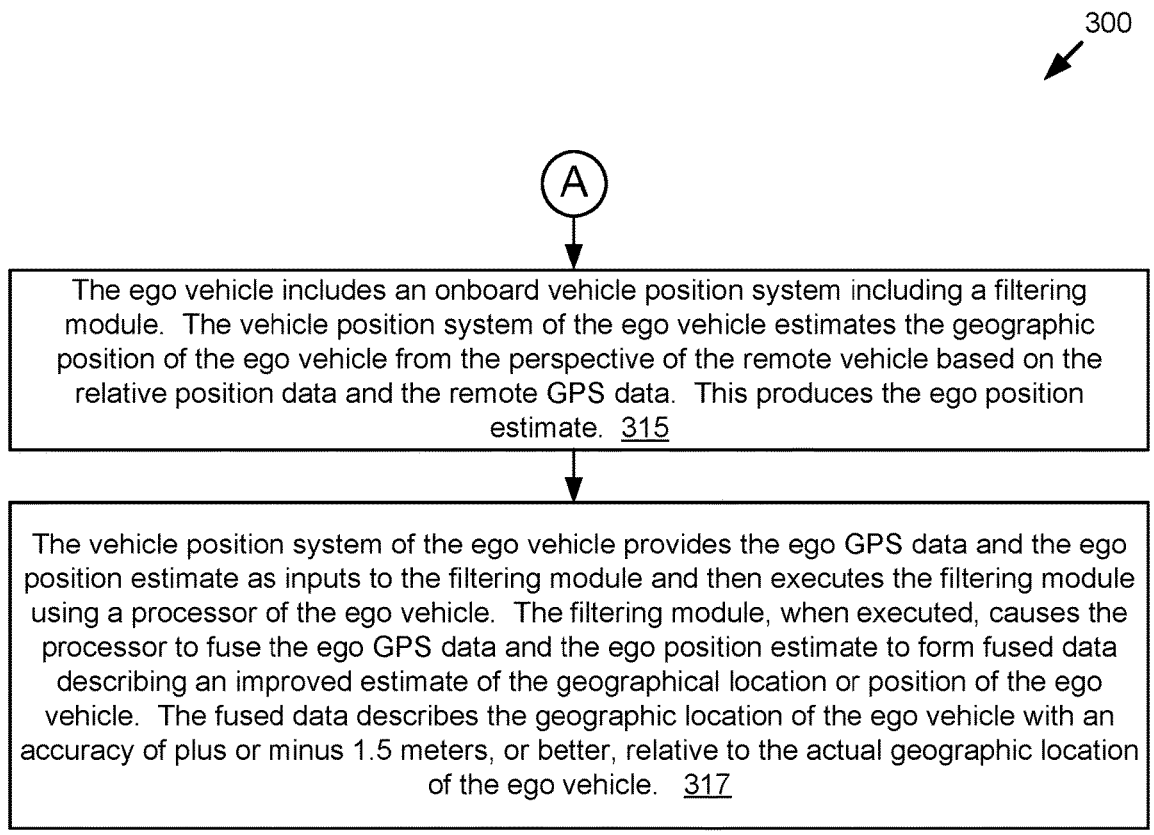

Referring now to FIGS. 3A and 3B, depicted is a flowchart of an example method 300 for determining fused data describing an improved estimate of a geographical position of an ego vehicle according to some embodiments. One or more of the steps described herein for the method 300 may be executed by one or more vehicle position systems.

Referring now to FIG. 3A. At step 301, the ego vehicle tracks its own geographic position using an onboard GPS unit to form ego GPS data.

At step 303, the remote vehicle tracks its own geographic position using an onboard GPS unit to form the remote GPS data.

At step 305, the remote vehicle tracks the geographic position of the ego vehicle using one or more onboard sensors (e.g., GPS, radar, LIDAR, cameras, etc.) that record their measurements as sensor data.

At step 307, the vehicle position system of the remote vehicle analyzes the sensor data to calculate angle data describing an angle separating the remote vehicle from the ego vehicle. The angle data may also describe the heading of the remote vehicle.

At step 308, the vehicle position system of the remote vehicle analyses the sensor data to calculate range data describing a range separating the remote vehicle from the ego vehicle.

At step 309, the vehicle position system of the remote vehicle analyzes the angle data and the range data to generate the relative position data. The relative position data describes the geographic location or position of the ego vehicle relative to the remote vehicle.

At step 311, the vehicle position system of the remote vehicle transmits a wireless message including, among other things, the relative position data and the remote GPS data. This wireless message may be transmitted to the network via DSRC, BSM message, LTE-V2X or some other form of wireless communication. The wireless message may include, for example, the remote vehicle wireless message.

At step 313, the ego vehicle receives the wireless message from the network.

Referring now to FIG. 3B. The ego vehicle includes an onboard vehicle position system including a filtering module. At step 315, the vehicle position system of the ego vehicle estimates the geographic position of the ego vehicle from the perspective of the remote vehicle based on the relative position data and the remote GPS data. This produces the ego position estimate.

At step 317, the vehicle position system of the ego vehicle provides the ego GPS data and the ego position estimate as inputs to the filtering module and then executes the filtering module using a processor of the ego vehicle. The filtering module, when executed, causes the processor to fuse the ego GPS data and the ego position estimate to form fused data. The fused data may describe an improved estimate of the geographical position or location of the ego vehicle. The fused data describes the geographic location of the ego vehicle with an accuracy of plus or minus 1.5 meters, or better, relative to the actual geographic location of the ego vehicle.

Referring now to FIG. 4A, depicted is a block diagram illustrating an example of the BSM data 195 according to some embodiments.

The regular interval for transmitting BSMs may be user configurable. In some embodiments, a default setting for this interval may be transmitting the BSM every 0.10 seconds or substantially every 0.10 seconds.

A BSM may be broadcasted over the 5.9 GHz DSRC band. DSRC range may be substantially 1,000 meters. In some embodiments, DSRC range may include a range of substantially 100 meters to substantially 1,000 meters.

Referring now to FIG. 4B, depicted is a block diagram illustrating an example of BSM data 195 according to some embodiments.

A BSM may include two parts. These two parts may include different BSM data 195 as shown in FIG. 4B.

Part 1 of the BSM data 195 may describe one or more of the following: vehicle position; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle traveling along a roadway system.

In some embodiments, some or all of the information described above for the BSM data 195 may be included in a DSRC message or a BSM.

Figure 5:
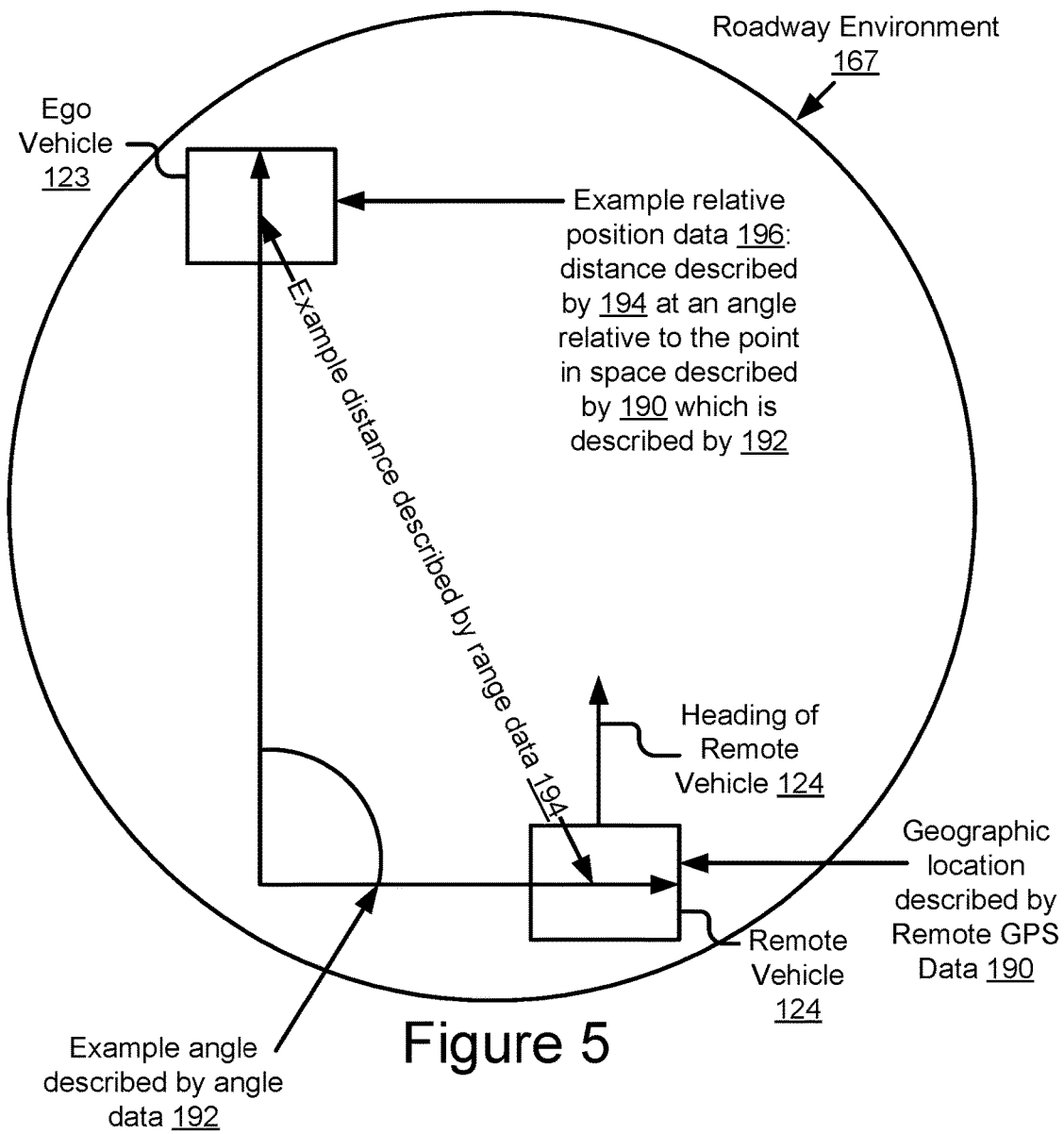
FIG. 5 is a block diagram illustrating a roadway environment including an example of range data, an example of angle data and an example of relative position data according to some embodiments.

Referring now to FIG. 5, depicted is a block diagram illustrating a roadway environment 167 including an example of range data 194, an example of angle data 192 and an example of relative position data 196 according to some embodiments.

One or more of the following devices may be a communication device: an ego vehicle 123; a remote vehicle 124; and an RSU 104. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the ego vehicle 123 (and other communication devices such as the RSU 104, the remote vehicle 124 or the server 103) may include a full duplex coordination system for implementing full-duplex wireless communications. The full duplex coordination system may include a processor and a memory storing instructions that, when executed, cause the full duplex coordination system to: create, at a first communication device (such as the remote vehicle 124, the ego vehicle 123, etc.), first data (such as any combination of the data stored on the memory 127) to transmit to a second communication device (such as a remote vehicle 124, an RSU 104, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 127) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 127) from a first communication device via a wireless channel; determine that a second communication device is a single destination of the first data based on the first portion of the first data; determine that the second communication device has second data (such as any combination of the data stored on the memory 127) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other embodiments may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., one or more full-duplex coordination systems installed in the ego vehicle 123, the remote vehicle 124, the RSU 104, the server 103 such as those depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for providing a more accurate estimate of a geographical position of an ego vehicle, the method comprising:
   receiving a wireless message from a network, wherein the wireless message includes remote Global Positioning System ("GPS") data and relative position data associated with a remote vehicle, wherein the relative position data includes range data and angle data which are measured by one or more onboard sensors of the remote vehicle;
   determining ego position estimate data based on the remote GPS data and the relative position data by calculating a point in space that is (1) located a first distance from a remote geographic location of the remote vehicle that is at least substantially equal to a second distance described by the range data and (2) at a first angle relative to a heading of the remote vehicle that is at least substantially equal to a second angle described by the angle data, wherein the ego position estimate data describes a first geographical location of the ego vehicle from a first perspective of the remote vehicle; and
   fusing the ego position estimate data and ego GPS data to form fused data, wherein the ego GPS data is retrieved by a GPS unit of the ego vehicle and describes a second geographical location of the ego vehicle from a second perspective of the ego vehicle and the fused data describes a third geographical location of the ego vehicle with an accuracy substantially equal to half a width of a roadway.

2. The method of claim 1, wherein the ego vehicle includes an Advanced Driver Assistance System ("ADAS system") that provides its functionality based on a positional information input describing a geographical position of the ego vehicle and the method further comprises:
   inputting the fused data to the ADAS system as the positional information input for the ADAS system; and
   executing the ADAS system using the fused data as the positional information input for the ADAS system.

3. The method of claim 1, wherein the ego vehicle includes an Advanced Driver Assistance System ("ADAS system") that provides safety functionality for the ego vehicle.

4. The method of claim 1, wherein the GPS unit is a conventional GPS unit and the ego GPS data is accurate to substantially plus or minus 10 meters relative to an actual geographic location of the ego vehicle.

5. The method of claim 1, wherein the remote GPS data describes the geographic location of the remote vehicle.

6. The method of claim 1, wherein the one or more onboard sensors of the remote vehicle include a camera that captures an image of the ego vehicle, the angle data is determined based on the image, and the wireless message is transmitted via cellular communication.

7. The method of claim 1, wherein the wireless message is transmitted by the remote vehicle and the wireless message is one of a Dedicated Short Range Communication ("DSRC") message and a cellular message.

8. The method of claim 1, wherein the wireless message is relayed to the ego vehicle by a Roadside Unit ("RSU").

9. A system including an ego vehicle, the ego vehicle comprising:
   a Global Positioning System ("GPS") unit; and
   an onboard vehicle computer system that is communicatively coupled to the GPS unit, the onboard vehicle computer system including a non-transitory memory storing computer code which, when executed by the onboard vehicle computer system causes the onboard vehicle computer system to:
      determine ego position estimate data based on remote GPS data and relative position data by calculating a point in space that is (1) located a first distance from a remote geographic location of a remote vehicle that is at least substantially equal to a second distance described by range data and (2) at a first angle relative to a heading of the remote vehicle that is at least substantially equal to a second angle described by angle data, wherein the range data and the angle data are measured by one or more onboard sensors of the remote vehicle; and
      fuse the ego position estimate data and ego GPS data to form fused data, wherein the ego position estimate data describes a first geographical location of the ego vehicle from a first perspective of the remote vehicle, the ego GPS data is retrieved by the GPS unit of the ego vehicle and describes a second geographical location of the ego vehicle from a second perspective of the ego vehicle, and the fused data describes a third geographical location of the ego vehicle with an accuracy of substantially equal to half a width of a roadway.

10. The system of claim 9, wherein the one or more onboard sensors of the remote vehicle include a camera that captures an image of the ego vehicle, the angle data is determined based on the image.

11. The system of claim 9, wherein the ego vehicle further comprises an Advanced Driver Assistance System ("ADAS system") that provides its functionality based on a positional information input describing a geographical position of the ego vehicle and the non-transitory memory stores further computer-executable code that, when executed by the onboard vehicle computer system, causes the onboard vehicle computer system to:

input the fused data to the ADAS system as the positional information input for the ADAS system; and execute the ADAS system using the fused data as the positional information input for the ADAS system.

12. The system of claim 9, wherein the remote GPS data and the relative position data are included in a wireless message that is transmitted to the ego vehicle by the remote vehicle.

13. The system of claim 12, wherein the wireless message is a Dedicated Short Range Communication ("DSRC") message.

14. The system of claim 12, wherein the wireless message is a full-duplex wireless message.

15. The system of claim 12, wherein the wireless message is a millimeter wave message.

16. The system of claim 12, wherein the wireless message is a Long-Term Evolution Vehicle-to-X ("LTE-V2X") message.

17. A computer program product comprising a non-transitory memory of an onboard vehicle computer system of an ego vehicle storing computer-executable code that, when executed by a processor, causes the processor to:

determine ego position estimate data based on remote GPS data and relative position data by calculating a point in space that is (1) located a first distance from a remote geographic location of a remote vehicle that is at least substantially equal to a second distance described by range data and (2) at a first angle relative to a heading of the remote vehicle that is at least substantially equal to a second angle described by angle data, wherein the range data and the angle data are measured by one or more onboard sensors of the remote vehicle; and fuse the ego position estimate data and ego GPS data to form fused data, wherein the ego position estimate data describes a first geographical location of the ego vehicle from a first perspective of the one or more sensors of the remote vehicle, the ego GPS data is retrieved by a GPS unit of the ego vehicle and describes a second geographical location of the ego vehicle from a second perspective of the ego vehicle, and the fused data describes a third geographical location of the ego vehicle with an accuracy of substantially equal to half a width of a roadway.

18. The computer program product of claim 17, wherein the one or more onboard sensors of the remote vehicle include a camera that captures an image of the ego vehicle, the angle data is determined based on the image.

19. The computer program product of claim 17, wherein the ego vehicle includes an Advanced Driver Assistance System ("ADAS system") that provides its functionality based on a positional information input describing a geographical position of the ego vehicle and the non-transitory memory stores further computer-executable code that, when executed by the processor, causes the processor to:

input the fused data to the ADAS system as the positional information input for the ADAS system; and execute the ADAS system using the fused data as the positional information input for the ADAS system.

20. The computer program product of claim 17, wherein remote GPS data and the relative position data are received via a wireless message received from a network and transmitted by a remote electronic device.

* * * * *